(12) United States Patent  (10) Patent No.: US 9,122,375 B2
Gärdenfors  (45) Date of Patent: Sep. 1, 2015

(54) METHOD FOR DISPLAYING CONTENT ITEMS ON AN ELECTRONIC DEVICE

(75) Inventor: Dan Zacharias Gärdenfors, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 112 days.

(21) Appl. No.: 13/565,443

(22) Filed: Aug. 2, 2012

(65) Prior Publication Data

US 2014/0040747 A1  Feb. 6, 2014

(51) Int. Cl.
  *G06F 3/0482* (2013.01)
  *G06F 17/30* (2006.01)
(52) U.S. Cl.
  CPC ........ *G06F 3/0482* (2013.01); *G06F 17/30064* (2013.01); *G06F 2203/04806* (2013.01); *G06F 2203/04808* (2013.01)
(58) Field of Classification Search
  CPC ............................ G06F 3/04855; G06F 3/0482
  USPC ........................................................ 715/728
  See application file for complete search history.

(56) References Cited

U.S. PATENT DOCUMENTS

| 2006/0090141 | A1* | 4/2006 | Loui et al. ...................... 715/764 |
| 2009/0322753 | A1* | 12/2009 | De Mers ........................ 345/428 |
| 2010/0134425 | A1* | 6/2010 | Storrusten ..................... 345/173 |
| 2010/0306704 | A1* | 12/2010 | Cotterill ........................ 715/833 |
| 2011/0239149 | A1* | 9/2011 | Lazo et al. .................... 715/772 |
| 2014/0012574 | A1* | 1/2014 | Pasupalak et al. ............ 704/235 |
| 2014/0028729 | A1* | 1/2014 | Abdukalykov et al. ....... 345/661 |
| 2014/0310623 | A1* | 10/2014 | O'Connell et al. ........... 715/764 |

OTHER PUBLICATIONS

Dipity, "Mark Krynsky", Dec. 11, 2012, http://www.dipity.com/krynsky/Mark_Krynsky/.*
Office Action issued in Canadian Application No. 2,821,713 on Dec. 29, 2014; 4 pages.

* cited by examiner

*Primary Examiner* — William Bashore
*Assistant Examiner* — Daniel Rodriguez
(74) *Attorney, Agent, or Firm* — Fish & Richardson P.C.

(57) ABSTRACT

Content items can be viewed on an electronic device based upon a property defined for each of the content items, allowing the user to navigate through the content list and view or select content items. When navigating portions of the list where a selection has been made where no content items are associated with the properties, the result may be the presentation of no data. In order to re-orient users, the selection is modified to display at least one content item.

23 Claims, 9 Drawing Sheets

METHOD FOR DISPLAYING CONTENT ITEMS ON AN ELECTRONIC DEVICE

TECHNICAL FIELD

The current application relates to graphical user interfaces displayed on electronic devices, and in particular to display and selection of content items in the graphical user interface.

BACKGROUND

Devices, for example touch sensitive-display or gesture input based devices allow users to interact with graphics and/or information presented on the display. For example, content that may be presented or selected in a list format may be provided in a visual or graphic object based display format allowing a user to view and interact with content. Some lists are just based on content items, such as contact lists, item or product lists, while others may be based upon time that they are received or generated such as e-mail messages, text messages, instant messages, social updates, and communication messages which may be associated with calendars or lists of content items created over time and be presented in an infographic such as a chart format or graphic object based content list showing representation of the content items. Other examples of time-based content collections include digital photo collections, life logs, multimedia diaries and social network time lines. When viewing lists that use a characteristic defined for each to all the content items to sort the content items, such as time, it can be useful to zoom the list view to modify what time span is shown on the screen (for example minutes, hours, days weeks, months). However, it can often happen that a user scrolls or zooms the list to show a portion where there is no content to be displayed, resulting in a blank display.

Therefore there is a need for an improved method for displaying content items on a display of an electronic device.

BRIEF DESCRIPTION OF THE DRAWINGS

Further features and advantages of the present disclosure will become apparent from the following detailed description, taken in combination with the appended drawings, in which:

FIG. 5A-D depicts a slider bar for range selection of content items;

It will be noted that throughout the appended drawings, like features are identified by like reference numerals.

DETAILED DESCRIPTION

In accordance with an aspect of the present disclosure there is provided a method for displaying content items on a display of an electronic device, the method comprising: displaying a plurality of content items in relation to a property common to each of the plurality of content items; receiving a range selection of the common property; modifying the range selection to include at least one content item outside of the received range selection; and displaying the at least one content item of the modified range selection.

In accordance with another aspect of the present disclosure there is provided an electronic device for displaying content list, the electronic device comprising: a display for displaying content items; a processor coupled to the display for executing instructions; a memory storing instructions for displaying content items on the display of the electronic device, the instructions when executed by the processor configuring the electronic device to provide: displaying a plurality of content items in relation to a property common to each of the plurality of content items; receiving a range selection of the common property; modifying the range selection to include at least one content item outside of the received range selection; and displaying the at least one content item of the modified range selection.

In accordance with yet another aspect of the present disclosure there is provided a non-transitory computer readable memory containing instructions for execution by a processor for providing a method for displaying content items on a display of an electronic device, the instructions performing a method comprising: displaying a plurality of content items in relation to a property common to each of the plurality of content items; receiving a range selection of the common property; modifying the range selection to include at least one content item outside of the received range selection; and displaying the at least one content item of the modified range selection.

As described further herein, the methods may be applied to various types of content items which may be presented in various visual or graphic object based format or interaction interfaces to enable a user to select content items. For example, the content items may be presented as graphic objects based content list sorted based on a property or characteristic associated with each content item in the content list. The properties can be used to sort present the content list in a chronological, alphabetical or numerical order providing a visual representation in the content list within a graphical user interface which can then be navigated through. The content list may be based upon any group of content items than can be visually represented and share a property that can be used to sort and display the content items. For example, photo collections, life logs, social network, contact lists, item or product lists, e-mail messages, text messages, instant messages, social updates, audio video communications, calendar items, digital photo collections, life logs, multimedia diaries, bookmarks, links and social network time lines can be sorted based upon a common property and presented visually. For example the graphic object based content list may be photos presented based upon timestamps in a timeline format to provide a visual representation when the photos were created and the number of photos within the timeline. The graphic object may be an infographic representation of the content items providing a representation of the content items relative to one or more properties of the content items in a graphical format. The graphic object may be an image of the content items or a representation of the content items. Alternatively the content list may be presented for content selection using a content selection slider that presents a property for selection or filtering of content items.

In a gesture based graphical user interface, a user may interact with the graphic object of a content item in content list by performing gestures to move through the content list and zoom in and out. An example of a gesture used to control the zoom functionality is a pinch gesture, in which a user contacts the display with two fingers, commonly the thumb and index finger, two thumbs, or two index fingers, and pinches the fingers together or spreads them apart to define a zoom region. By selecting a graphic object based content list, or content selection slider, the user can move in or out of the content list by gestures to navigate the associated content list.

In the representation of content lists, particularly in a graphic object based format, when a range associated with the sort properties of the content list is selected, it is easy for a zoom of the list or associated content to present or display no content if there is no content within the range of the sort characteristic. The resulting display of an absence of content items can confuse or mislead the user with the graphical user interface. In electronic devices that provide interactive displays, such as touch-sensitive or gesture based displays, graphic object based content lists enable a user to easily interact to navigate through the list. To avoid the user being lost when manipulating content items a snap-to pattern can be used to control user's interaction by automatically zooming the content lists, such as time based list, so that there is always some content visible.

In the scenario where a user interacts with any type of list that has empty spaces in it relative to the property which is use to sort the content list, a bounce back zoom type effect can be provided when the user scrolls or zooms the list to a position where no list content is shown on the screen. When a portion of the content list is selected that has no content items, the expansion of the list can deflate back to a viewable level by automatically zooming back to a previous level. Alternatively the content list can revert to a level showing a pre-defined amount of content items or visual aspect of the content items in the content list. By showing at least some content in the graphical user interface the user can remain oriented within the content list. The content list interaction may alternatively occur through an external selector such as adjusting the size of an external scroll bar to apply some type of selection or filtering to content items. If the scroll bar or filter adjustment results in no content being shown, this action can be reversed or the slider expands after a time out to help users avoid viewing at empty content lists.

Figure 1:
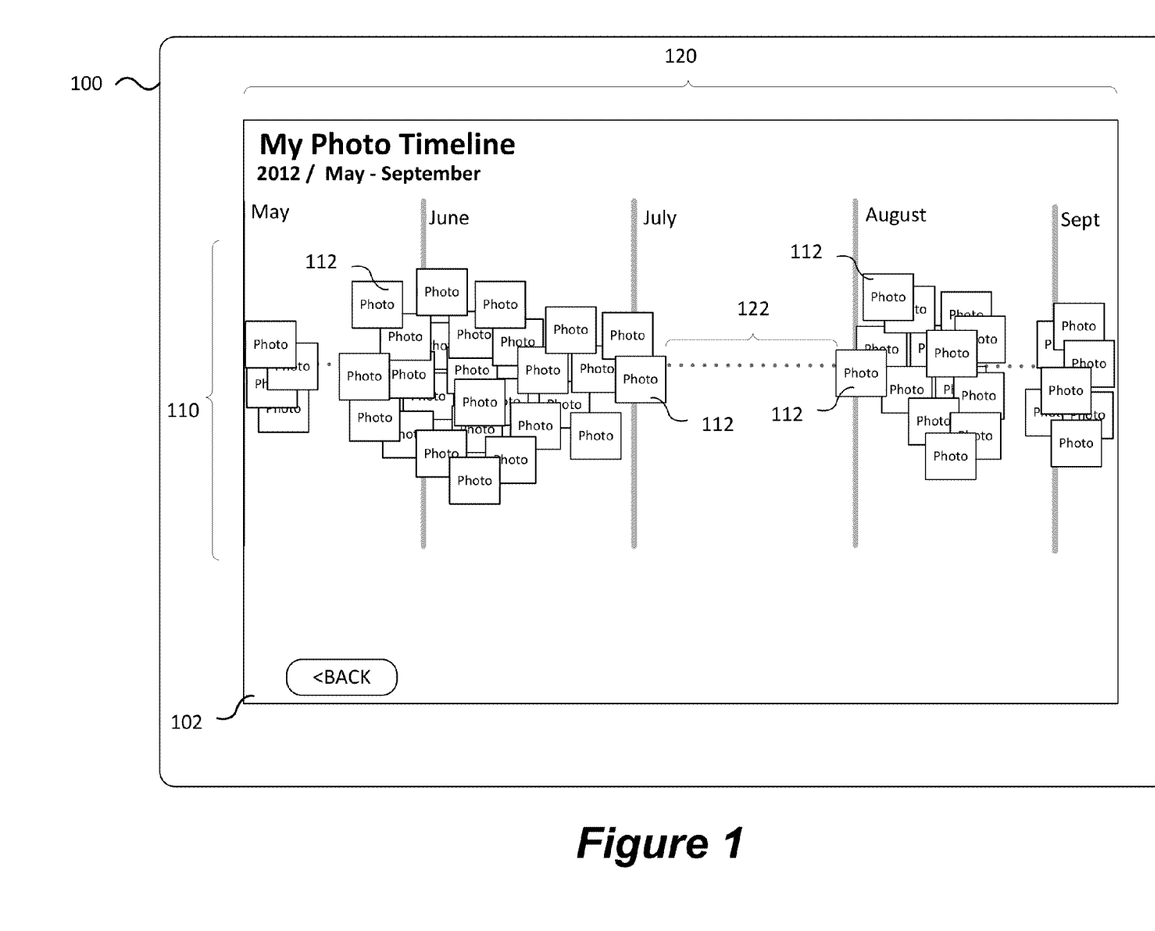
FIG. 1 depicts a content items displayed on an electronic device.

FIG. 1 depicts an electronic device 100 displaying graphic object content items. In this example the graphic object based content list is a collection of photographs 110 presented against a timeline format on a display 102 of the electronic device 100. The photographs or images 112 are presented along a timeline 120 based upon a time property of each photograph. The time may be based for example when the photo was taken. The photographs 112 may be arranged to provide a visual representation of the number of photographs 112 for a particular date and enable a user to move along the timeline or select individual photographs to view. Within the timeline 120 there is a blank portion 122 in the content list of photographs 110 where no photographs 112 are present. In this example the range spans a number of months, May to October, although varying levels of granularity may be used. Each photograph 122 includes metadata, for example Exchangeable image file format (Exif) information providing a timestamp used to order the content list 110 In this example a time period 122 between the months of July and August has not content items defined in the list and therefore is empty. The photographs 112 may be positioned within the timeline based upon addition properties present in the metadata, although this implementation may vary based upon the application.

Figure 2:
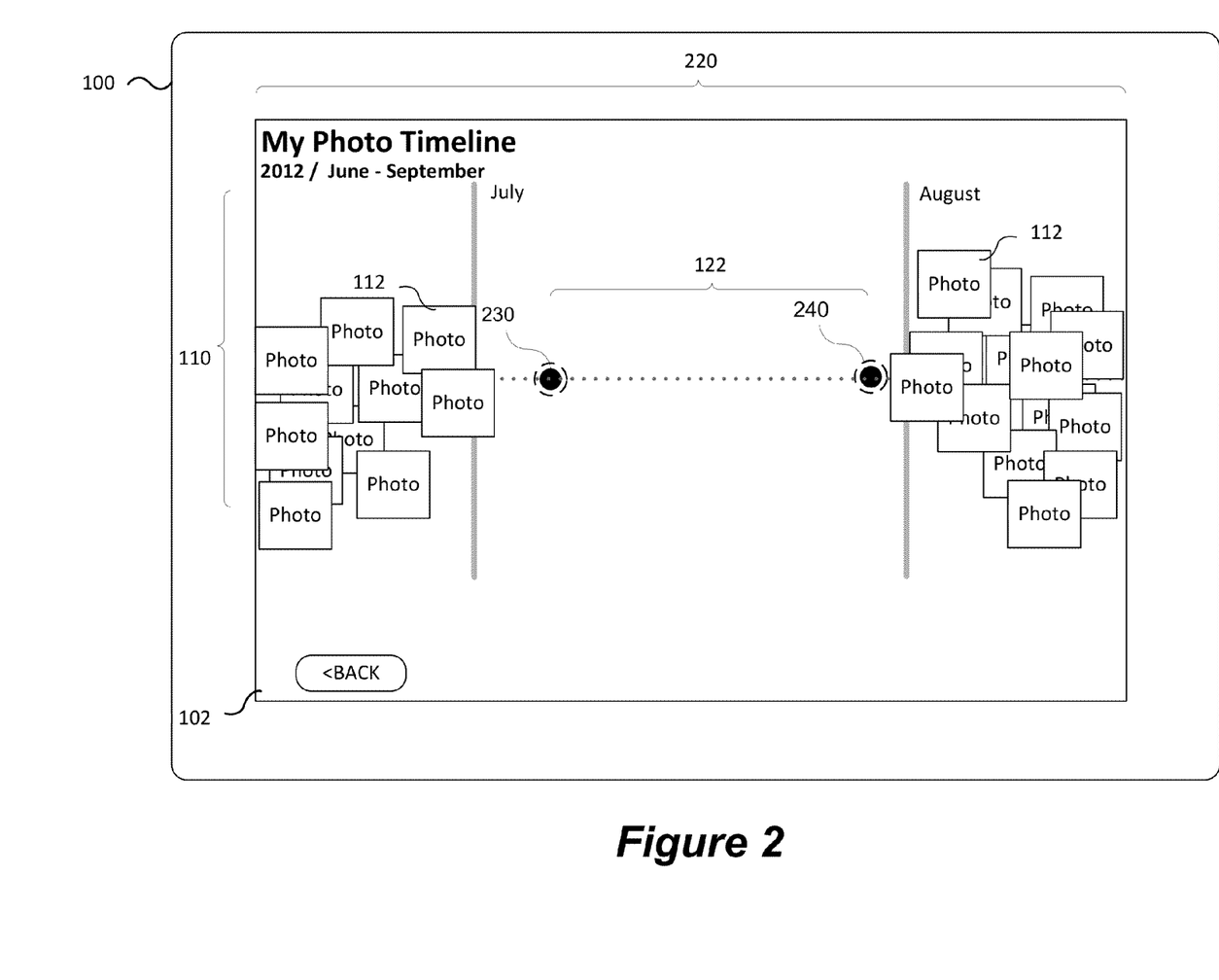
FIG. 2 depicts a zoom-in on the content items displayed on the electronic device.
Figure 3:
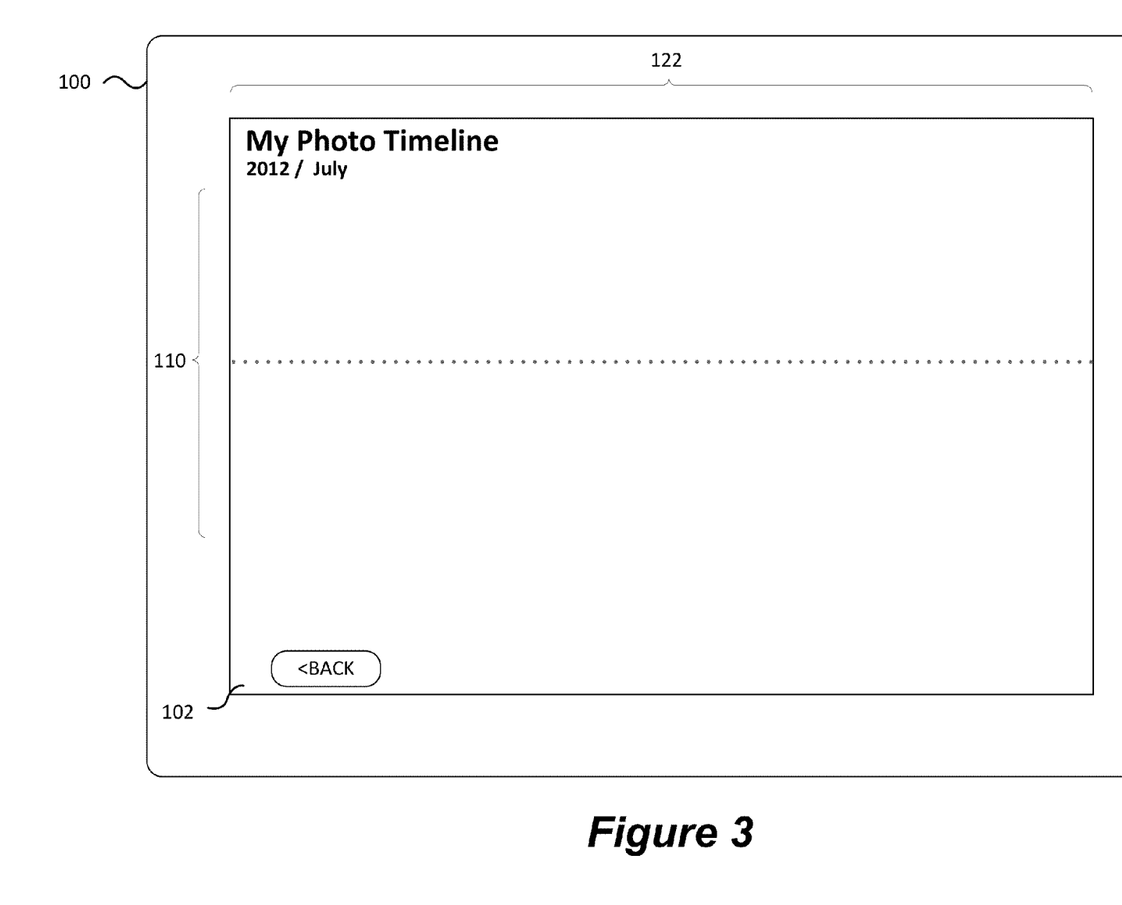
FIG. 3 depicts a further zoom-in on the content items displayed on the electronic device where no content is displayed.

Turning to FIG. 2, the content list has been zoomed into a smaller time period 220, showing fewer photographs 122, June to September; with the graphic object based content list adjusting in size accordingly. Content items are still viewable in the months of June and August however the portion 122 where content is not present may be shown as a large span. A user may zoom into portion 122 of the photographs 110 timeline 120 by touching the touch-sensitive display in two or more points defining multi-point contacts depicted as concentric circles 230, 240. The multi-point contacts 230, 240 are used to indicate a selection area or portion 122 of the content list 110 for which more detailed information is desired to be displayed for example content in the month of July. The area is expanded in a zoom gesture, for example by spreading of the user's fingers apart on the touch-sensitive display of the electronic device. Alternatively the zoom or selection may be made by a voice command or slider selection. As shown in FIG. 3 the user expands the portion 122 defined by the contact points 230 and 240 where no photographs 112 are present. The display 102 then shows a blank timeline portion 122 as the content list along the timeline 110 is empty in the selected portion 122. The user may then not be aware of where content is present within the content list or which part of the list content is present. In order to re-orient the user, after a pre-defined delay period, the display may deflate or revert back to the previous display, such as in FIG. 2, or alternatively it may revert to a display which shows at least a portion of content such as in FIG. 4.

Figure 4:
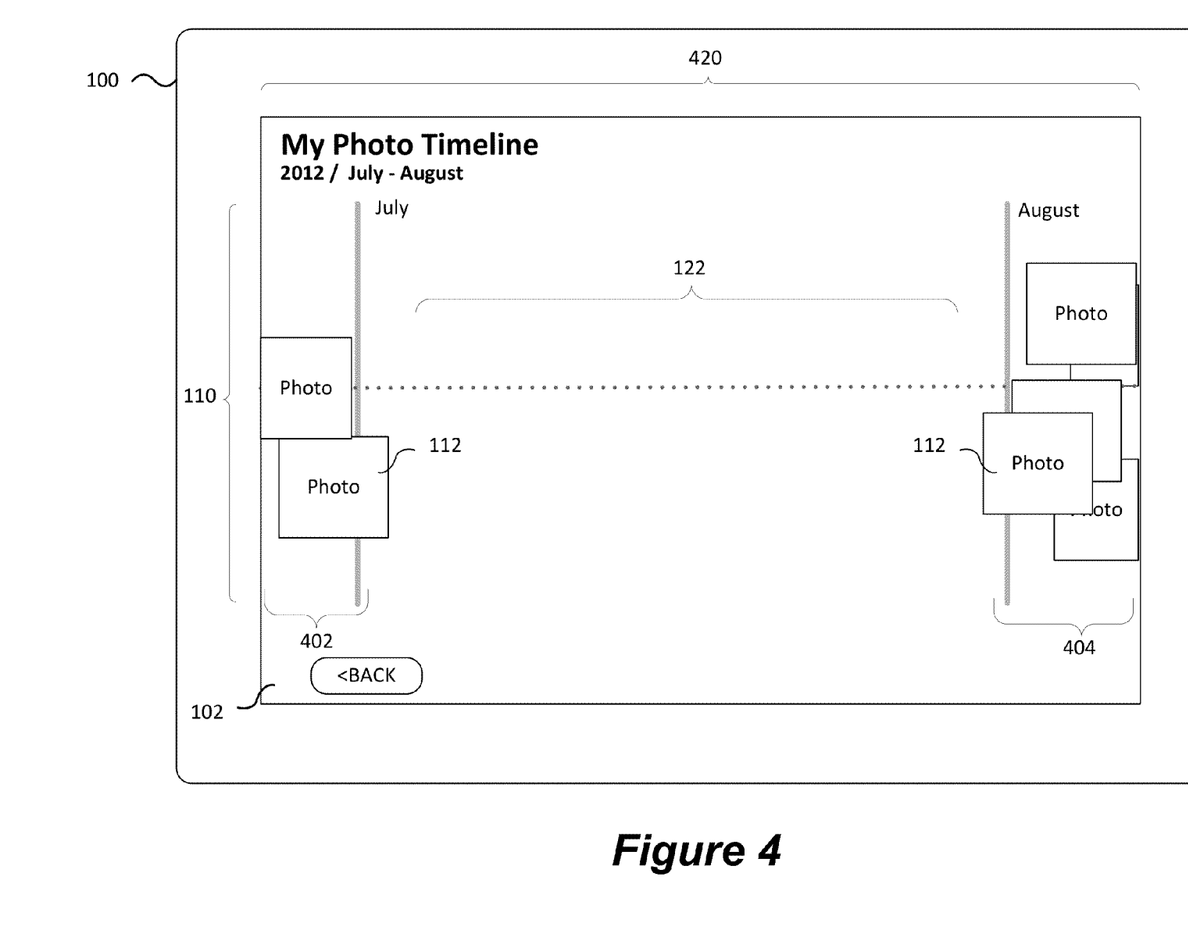
FIG. 4 depicts a zoom-out on the content items displayed on the electronic device.

In FIG. 4 a snap-to time period 420 is shown having portions of data 402 and 404 of the graphic object based content list 110 at the edges of the display. In this example photographs 112 from the end of June 402 and the start of August 404 are displayed such that the user is aware where content items are defined in the list. Depending on the type of content list, the amount of content that is shown in the snap-to function may be predefined or specified within a range of values. For example, at least 10 days of content items must be displayed, or at least two items must be displayed or a defined screen area must show a portion of the content list.

Figure 5:
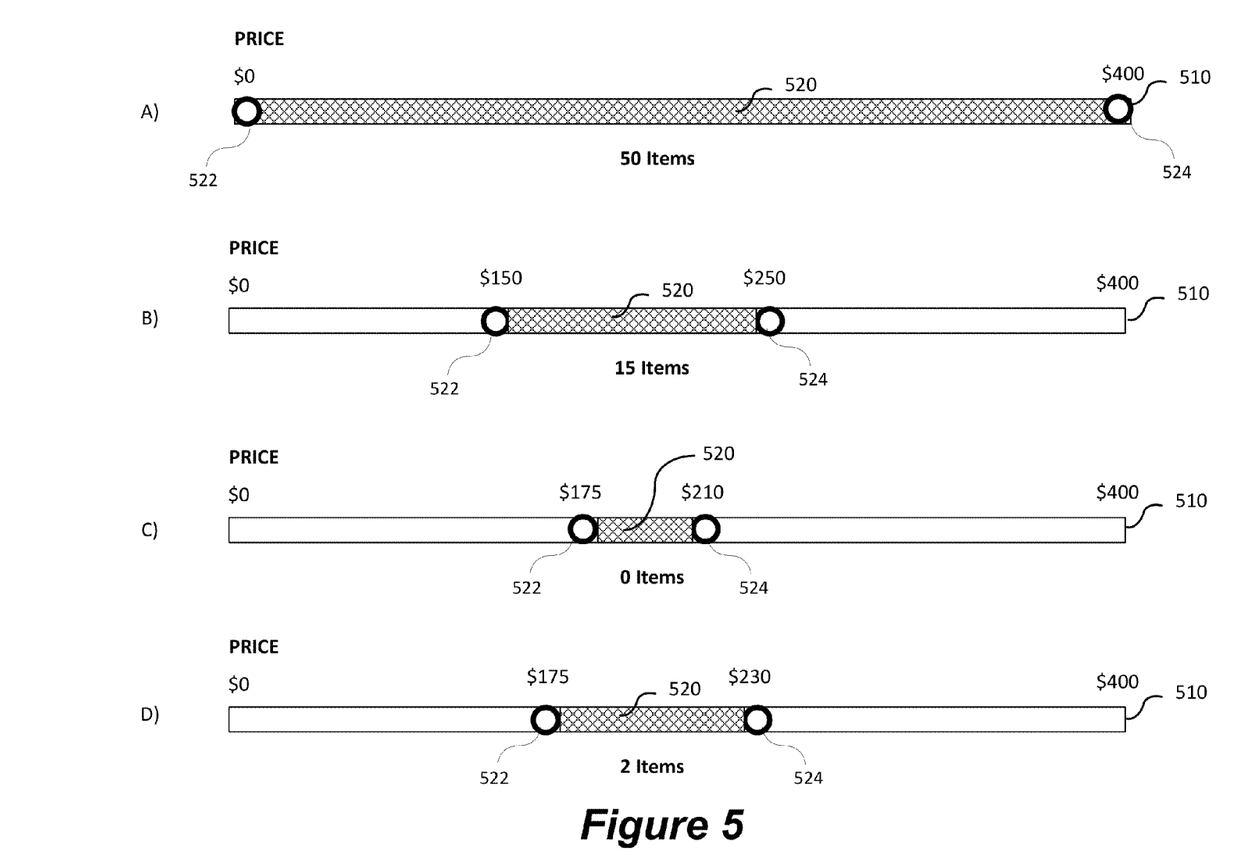

FIG. 5 depicts an alternative embodiment where a slider bar for range selection of content items is shown to illustrate the snap-to function. The slider bar 510 is associated with content items of product items, the property is defined for the price of the products the slider is used to selected products from the content list based upon the associated price. The slider bar may be combined with a graphical representation of the content items presented in a graphic object based content list such as the info-graphic shown in FIGS. 1 to 4. As shown in 5A a slider 510 defines a range of for the particular property of price of the items used to select content from content items. In this example the range is for the price is for example $0 to $400. The number of items in the list, 50 items, is defined by the range of the slider 520 defined by control points 522 and 524. As shown in 5B the control points 522 and 524 have been adjust to define a portion of the total range, $150 to $250, the slider 520 is smaller and only displaying for example 15 items from the total content list. However if the range is reduced by the user for example by zooming-in the control points 522 and 524 to the $175 to $210 range as shown in 5C, the slider 520 now displays zero items in the content list. In order to assist the user, after a defined period the slider may revert back to the previous selection as shown in 5B or may transition to a default selection based upon a pre-defined parameter of a minimum number of items for example as shown in 5D. Control point 522 and 524 are expanded automatically to snap-to the 2 items in the content list, within the $175 to $230 range.

Figure 6:
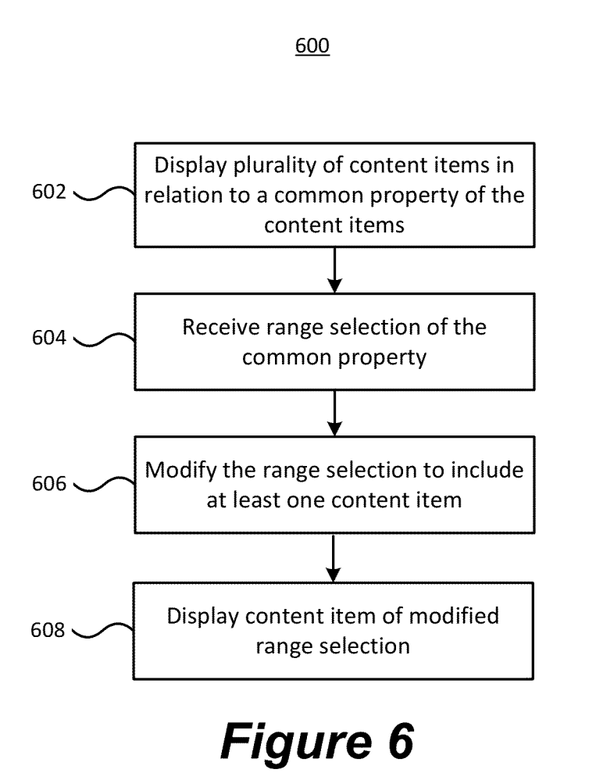
FIG. 6 depicts a method of displaying content items.

FIG. 6 depicts a method 600 of displaying content items. The content items, can be presented in a content list are displayed, or a portion of the content list is displayed on the electronic device in relation to a property common to each of the plurality of content items (602). The common property, or characteristic, can be any property such a number, date, time, measure, position, location, rank, or distance that enables the content items to be ordered numerically, alphabetically or chronologically. A range selection of the common property is received (604) by for example a zoom selection, gesture, slider selection, voice command, or range input. The range selection is modified to include at least one content item outside of the received range selection (606). The at least one content item of modified range selection is displayed (608). The selected range may be displayed prior to modifying the received range selection, but may not display any content items. An amount of time for displaying the range selection may be defined to provide a visual bounce-back graphical effect for displaying the graphical content items. The modification of the range selection may comprise selection of at least two content items wherein the two content items defined the bounds of the modified range selection so that content items are visible at either side of the range.

Figure 7:
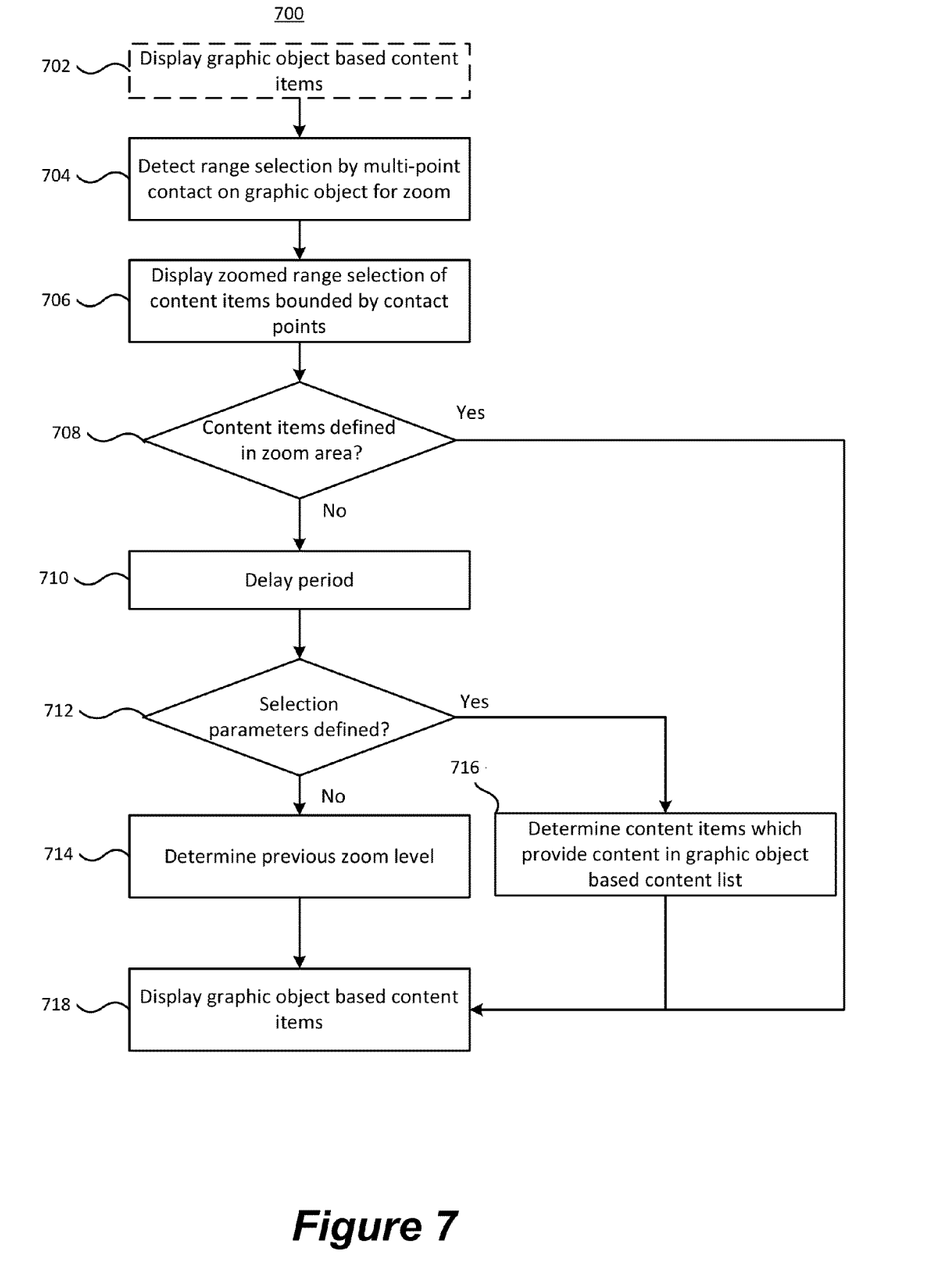
FIG. 7 depicts a method of range selection of content items.

FIG. 7 depicts a method 700 of range selection of content items to illustrate the snap-to function. The graphic object based content list, derived from associated content items, and is displayed on a display of an electronic device (702) relative to a property defined for each of the content items. The presentation of the content list may be in a graphic object based format such as an info-graphic. A selection of a range based upon the common property defined for each of content items in the content list is received through a selection or zoom-in gesture (704) performed by a multi-touch gesture. This may be performed by pinching to zoom-in to a range of the content list. The selection range is displayed (706). If there are content items in the content list defined in the selected range (YES at 708), the selected content items, or a representation of the content items, are displayed (718) on the display of the electronic device. If there are no content items in the selected range (NO at 708), after a defined delay period (710) has expired, it is determined if selection parameters are define for the graphic object based content list. For example the parameters may define how the snap-to function re-adjusts the graphic object based content list when a portion of no content has been selected. If selection parameters are defined, (Yes at 712), such as a number of content items that should be displayed or distance along the axis that should display content items, the content items that should be displayed in the list relative to the parameter are determined (716) and displayed (718). If selection properties are not defined (No at 714), the display of the graphic object based content list will revert to a previous zoom selection level prior to the selection of the region with no content and then displayed (718).

Figure 8:
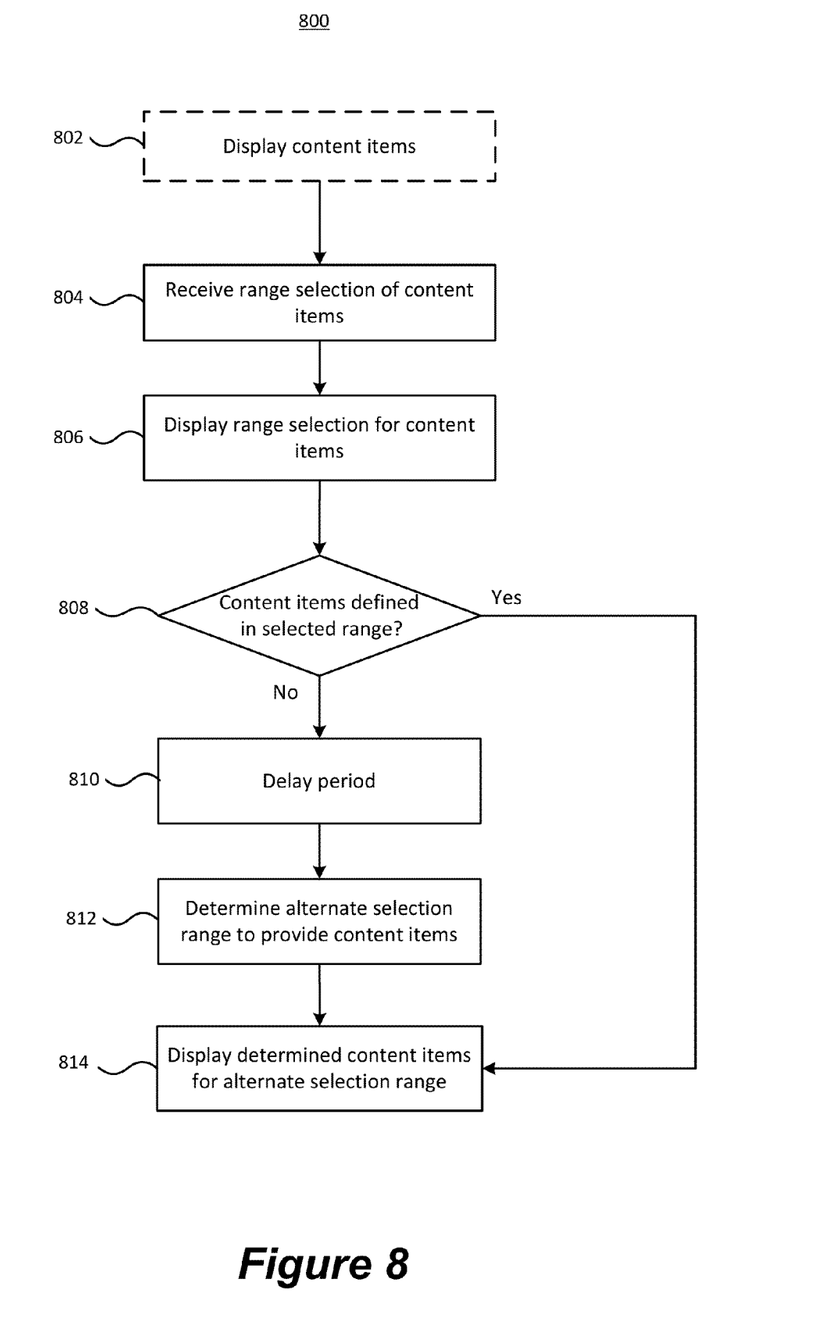
FIG. 8 depicts an alternative method of range selection of content items.

FIG. 8 depicts a method 800 of range selection of content items, which is used to illustrate a snap-to function. The content list is displayed on a display of an electronic device (802) based upon a property defined for each of the content items in the content lists. The presentation of the content list may be controlled by a selection bar such as a scroll bar, or associated with a graphic object based content list which provide the ability to define selection ranges of a common property defined for each of the content items. A selection of a range of content items is received through a selection or zoom-in function (804). This may be performed by pinching to zoom-in to a range of the content items list, moving control points on a slider, providing a voice command, or input range values. The selected range is displayed on the electronic device (806). If there are content items in the content list defined in the selected range (YES at 808), the selected content items are displayed (816) on the display of the electronic device, which may be in a graphical presentation of some form of listing format. If there are no content items in the selected range (NO at 808) the selected range is displayed for pre-defined delay period (810) and the display would revert to an alternate selection such as a previous zoom selection level (802), or to a range or selection level that has been defined (812) by a selection parameter. The alternate selection of content items is then displayed on the display of the electronic device (814).

Figure 9:
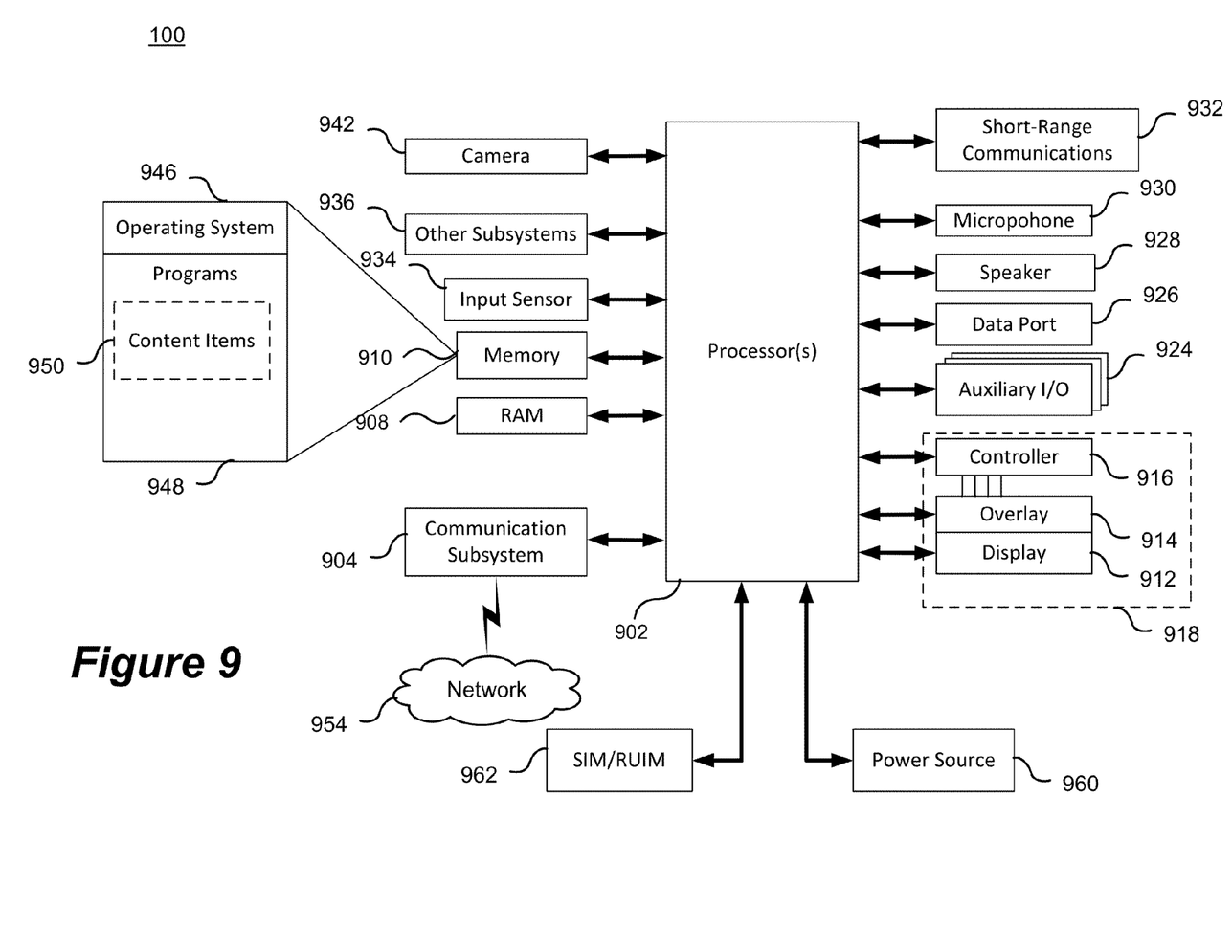
FIG. 9 depicts an electronic device for displaying content items.

FIG. 9 show a block diagram of an electronic device 100 in accordance with an illustrative embodiment. A processor 902, a multiple core processor or multiple processors may interface with components or modules of the electronic device to provide functionality required. A touch-sensitive interface is provided by a touch-sensitive display 918 coupled to the processor 902. The touch-sensitive display 918 may be any suitable touch-sensitive display, such as a capacitive, resistive, infrared, dispersive signal, acoustic pulse recognition, optical imaging, surface acoustic wave (SAW). In the presently described embodiment, the touch-sensitive display 918 is a capacitive touch-sensitive display which includes a capacitive touch-sensitive overlay 914. The overlay 914 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The processor 902 interfaces with memory 910 providing an operating system 946 and programs or applications 948 providing instructions for execution by the processor 902. Random access memory 908 is provided for the execution of the instructions and for processing data to be sent to or received from various components of the electronic device. The instructions when executed by the processor 902 may configure the electronic device to provide various functionality for displaying data. The functionality may include functionality 950 for presentation and display of selections of content items as described herein. Although the functionality 950 is depicted as being separate from the operating system 946, it is contemplated that the functionality could be provided as component of the operating system.

Alternatively or in addition to sensing touch via the touch-sensitive display, proximity sensing input may be used from various input/out devices or sensors 936 of the device. For example an accelerometer, light and/or infrared sensors, magnetic sensor such as a Hall Effect sensor, and optical sensor or cameras 942 which may be used for detection of an object above the touch-sensitive display. A communication subsystem 904 is provided for enabling data to be sent or received with a local area network 954 or wide area network utilizing different physical layer and access technology implementations.

A subscriber identity module or removable user identity module 962 may be provided depending on the requirement of the particular network access technology to provide user access or identify information. Short-range communications 932 may also be provided and may include near-field communication (NFC), radio frequency identifier (RFID), Bluetooth technologies. The electronic device may also be provided with a data port 926 and auxiliary input/output interface 924 for sending and receiving data. A microphone 930 and speaker 928 may also be provided to enable audio communications via the electronic device 100.

The display 912 of the touch-sensitive display 918 may include a display area in which information may be displayed, and a non-display area extending around the periphery of the display area. Information is not displayed in the non-display area, which is used to accommodate, for example, electronic traces or electrical connections, adhesives or other sealants, and/or protective coatings around the edges of the display area. The non-display area may be used to initiate actions, such as a copy or paste action rather than using a menu selection or gesture on the display area of the display.

One or more touches, also known as gestures, may be detected by the touch-sensitive display 918, and may include the multi-point contact or touch gesture described herein. The contacts or touch gestures may be performed using a finger, stylus or other object. The processor 902 may determine attributes of the gesture, including a location or locations of contact. Gesture information may include an area of contact or a single point of contact, such as a point at or near a center of the area of contact, known as the centroid. A signal is provided to the controller 916 in response to detection of a contact or contacts. A contact may be detected from any suitable object, such as a finger, thumb, appendage, or other items, for example, a stylus, pen, or other pointers, depending on the nature of the touch-sensitive display 918. The location of the contact may remain stationary or the location may move as the detected object moves during the gesture. The controller 916 and/or the processor 902 may detect a contact by any suitable contact member on the touch-sensitive display 918. Similarly, multiple simultaneous touches are detected.

The methods described as being applied to a touch-sensitive display device but are equally applicable to gesture based systems. It is contemplated that the methods can be applied to other devices that are capable of detecting multi-point contact gestures without requiring physical contact with the display. For example, 3-dimensional (3-D) gestures may be used to provide multi-point contact gestures through the use of one or more cameras, infrared light sensors, proximity detectors, or other sensors. A multi-point contact gesture performed in 3-D space may require determining the location on the displayed graphic that the 3-D gesture relates to. The contact points may be shown on the display to provide information to the user regarding the location of the multi-point contact gesture. It may be difficult to distinguish a multi-point contact gesture in 3-D space from another type of gesture, such as pointing to an object or moving an object. It is contemplated that further information could be incorporated into determining if the gesture is intended as a multi-point contact gesture or not. For example, a button, key or keys could be pressed on an input control to specify that the gesture is a multi-point gesture. Additionally, or alternatively a voice command could be used to indicate that the 3-D gesture is intended to be a multi-point contact gesture. Although it is contemplated that the multi-point contact may include a gesture performed in 3-D space, the gesture is described below for clarity of the description.

In some embodiments, any suitable computer readable media can be used for storing instructions for performing the methods described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed:

1. A method for displaying content items on a display of an electronic device, the method comprising:
    displaying a plurality of content items along a timeline;
    receiving, after the displaying, a selection of two different dates on the timeline, the two different dates defining a range;
    determining, by the electronic device after the receiving, that none of the plurality of content items are associated with dates of the range;
    the electronic device automatically modifying the range, after the determining, to include at least one content item outside of the range in response to the electronic device determining that none of the plurality of content items are associated with dates of the range; and
    displaying, after the modifying, the at least one content item of a modified range selection.

2. The method of claim 1 further comprising displaying the received range selection with none of the plurality of content items prior to modifying the received range selection.

3. The method of claim 2 wherein the received range selection is displayed for a defined time period prior to modifying the range selection.

4. The method of claim 1 wherein the range selection is modified to include at least two content items.

5. The method of claim 4 wherein one of the content items of the at least two content items is at a date before an earlier one of the two different dates, and the second of the at least two content items is at a date after a later one of the two different dates.

6. The method of claim 1 wherein the modifying the range to include the at least one content item outside the range comprises determining a previously displayed content item and a previously displayed range.

7. The method of claim 1 wherein the range selection is received by a voice command.

8. The method of claim 1 wherein the received range selection is received by a gesture performed in a graphical user interface.

9. The method of claim 8 wherein the gesture is a zoom of a graphic object based content list in the graphical user interface, wherein the range selection is in a portion of the content list where no content items are associated with the dates of the received range selection.

10. The method of claim 1 wherein determining the range selection comprises determining a previous displayed selection wherein the determined range selection is reverted back to the previous displayed selection.

11. The method of claim 1 wherein the content items are selected from one or more from the group consisting of: images, video, audio recordings, e-mail messages, text messages, instant messages, status update messages, social network messages, blog messages, bookmarks, links, video communications, and audio communications.

12. The method of claim 1 wherein the range selection is determined from a variable width of a slider bar for selecting the range selection of a property associated with the plurality of content items to be displayed based upon the content items selected in the content list within the selected range defined by two control points.

13. An electronic device for displaying content items, the electronic device comprising:
   a display for displaying the content items;
   a processor coupled to the display for executing instructions;
   a memory storing instructions for displaying content items on the display of the electronic device, the instructions when executed by the processor configuring the electronic device to provide:
      displaying a plurality of content items along a timeline;
      receiving, after the displaying, a selection of two different dates on the timeline, the two different dates defining a range;
      determining, by the electronic device after the receiving, that none of the plurality of content items are associated with dates of the range;
      the electronic device automatically modifying the range, after the determining, to include at least one content item outside of the range in response to the electronic device determining that none of the plurality of content items are associated with dates of the range; and
      displaying, after the modifying, the at least one content item of a modified range selection.

14. The electronic device of claim 13 further comprising displaying the received range selection with none of the plurality of content items prior to modifying the received range selection.

15. The electronic device of claim 14 wherein the received range selection is displayed for a defined time period prior to modifying the range selection.

16. The electronic device of claim 14 wherein the range selection is modified to include at least two content items wherein one of the content items of the at least two content items is at a date before an earlier one of the two different dates, and the second of the at least two content items is at a date after a later one of the two different dates.

17. The electronic device of claim 13 wherein the modifying the range to include the at least one content item outside the range comprises determining a previously displayed content item and a previously displayed range.

18. The electronic device of claim 13 wherein the range selection is received by a voice command or by a gesture performed in a graphical user interface.

19. The electronic device of claim 13 wherein the range selection is a zoom of a graphic object based content list in the graphical user interface, wherein the range selection is in a portion of the content list where no content items are associated with the dates of the received range selection.

20. The electronic device of claim 13 wherein determining the range selection comprises determining a previous displayed selection wherein the determined range selection is reverted back to the previous displayed selection.

21. The electronic device of claim 13 wherein the content items are selected from one or more from the group consisting of: images, video, audio recordings, e-mail messages, text messages, instant messages, status update messages, social network messages, blog messages, bookmarks, links, video communications, and audio communications.

22. The electronic device of claim 13 wherein the range selection is determined from a variable width of a slider bar for selecting the range selection of a property associated with the plurality of content items to be displayed based upon the content items selected in the content list within the selected range defined by two control points.

23. A non-transitory computer readable memory containing instructions for execution by a processor for providing a method for displaying content items on a display of an electronic device, the instructions performing a method comprising:
   displaying a plurality of content items along a timeline;
   receiving, after the displaying, a selection of two different dates on the timeline, the two different dates defining a range;
   determining, by the electronic device after the receiving, that none of the plurality of content items are associated with dates of the range;
   the electronic device automatically modifying the range, after the determining, to include at least one content item outside of the range in response to the electronic device determining that none of the plurality of content items are associated with dates of the range; and
   displaying, after the modifying, the at least one content item of a modified range selection.

* * * * *